United States Patent
Cromer et al.

(10) Patent No.: US 6,304,899 B1
(45) Date of Patent: Oct. 16, 2001

(54) DATA PROCESSING SYSTEM AND METHOD FOR POWERING-ON A REMOTE CLIENT COMPUTER SYSTEM UTILIZING A WIRELESS SIGNAL

(75) Inventors: Daryl Carvis Cromer, Cary; Richard Alan Dayan, Wake Forest; Howard Locker; Michael Steinmetz, both of Cary; James Peter Ward, Raleigh, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/169,288

(22) Filed: Oct. 8, 1998

(51) Int. Cl.[7] ........................................ G06F 13/00
(52) U.S. Cl. ........................................... 709/217
(58) Field of Search .................... 709/217, 227–228, 709/250, 202–203, 229; 713/2; 379/142; 359/139

(56) References Cited

U.S. PATENT DOCUMENTS

| | | | |
|---|---|---|---|
| 5,479,483 | * 12/1995 | Furuya et al. | 455/433 |
| 5,572,528 | * 11/1996 | Shuen | 370/402 |
| 5,991,287 | * 11/1999 | Diepstraten et al. | 370/338 |
| 6,003,092 | * 12/1999 | Waters | 709/248 |
| 6,052,779 | * 4/2000 | Jackson et al. | 713/2 |
| 6,101,013 | * 8/2000 | Monacos | 359/139 |
| 6,111,939 | * 8/2000 | Brabanec | 379/142 |

* cited by examiner

Primary Examiner—David Wiley
(74) Attorney, Agent, or Firm—George E. Grosser; Andrew Dillon

(57) ABSTRACT

A method and system are described for booting a remote client computer system included within a data processing system. The data processing system includes a server computer system and at least one client computer system. A physical region is specified within which the client computer system resides. A wireless signal is transmitted to the physical region and is received by the client computer system. A determination is made whether the wireless signal includes a specification of the client computer system. If the wireless signal includes a specification of the client computer system, the client computer system boots and establishes an association with the server computer system as a client of the server computer system.

28 Claims, 6 Drawing Sheets

DATA PROCESSING SYSTEM AND METHOD FOR POWERING-ON A REMOTE CLIENT COMPUTER SYSTEM UTILIZING A WIRELESS SIGNAL

BACKGROUND OF THE INVENTION

1. Field of the Invention

The present invention relates in general to data processing systems and, in particular, to a data processing system for booting a remote computer system. Still more particularly, the present invention relates to a method and system in a data processing system for booting a remote client computer system located within a specified physical region utilizing a wireless signal.

2. Description of the Related Art

Personal computer systems have attained widespread use for providing computing power to many segments of today's modern society. Personal computer systems can usually be defined as a desk top, floor standing, or portable microcomputer that consists of a system unit having at least one system processor and associated volatile and non-volatile memory, a display monitor, a keyboard, one or more diskette drives, a fixed disk storage, and an optional printer. One of the distinguishing characteristics of these systems is the use of a motherboard (also known as and occasionally mentioned herein as a system board, system planar, or planar) to electronically connect these components together. These systems are designed primarily to give independent computing power to a single user and are inexpensively priced for purchase by individuals or small businesses. Examples of such personal computer systems are IBM's Intellistation and IBM's PC 300 PL and PC 300GL.

Typically, in a business environment, many computer systems are distributed throughout various locations within the physical facilities. Keeping track of the physical location of each computer system is difficult. The difficulty in maintaining an accurate record of each computer system's current physical location greatly increases as the number of computer systems increases. Contributing to this problem is the likelihood that at least some of these computer systems will be moved from one location to another.

One known standard for computer systems is the Desktop Management Interface (DMI) standard from the Desktop Management Task force. The standard defines a framework for collecting and storing management information from desktop PC hardware, software, and peripherals. For example, asset and inventory information may be managed utilizing the DMI standard.

In some known networked computer systems, each network controller may be associated with a unique address. Utilizing the unique address of the controller, each client physically coupled to the network may be identified. However, the address of the controller is not associated with a physical location. Therefore, if the controller is moved to a new physical location, the record of the physical locations of the computer systems again becomes inaccurate.

Universal unique identifiers (UUIDs) are well known in the PC industry which may be associated with each computer system included within a data processing system. Utilizing the UUIDs, each computer system may be uniquely identified. The UUID associated with a particular computer system identifies the computer system, but not the physical location of the computer system.

Therefore a need exists for a method and system in a data processing system for a server computer system to be able to cause a remote computer system located within a specified physical region to boot, and the remote computer system establishing a server\client relationship with the server.

SUMMARY OF THE INVENTION

It is therefore one object of the present invention to provide an improved data processing system.

It is another object of the present invention to provide a method and system in a data processing system for booting a remote computer system.

It is yet another object of the present invention to provide a method and system in a data processing system for booting a remote client computer system located within a specified physical region utilizing a wireless signal.

The foregoing objects are achieved as is now described. A method and system are described for booting a remote client computer system included within a data processing system. The data processing system includes a server computer system and at least one client computer system. A physical region is specified within which the client computer system resides. A wireless signal is transmitted to the physical region and is received by the client computer system. A determination is made whether the wireless signal includes a specification of the client computer system. If the wireless signal includes a specification of the client computer system, the client computer system boots and establishes an association with the server computer system as a client of the server computer system.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

Figure 1:
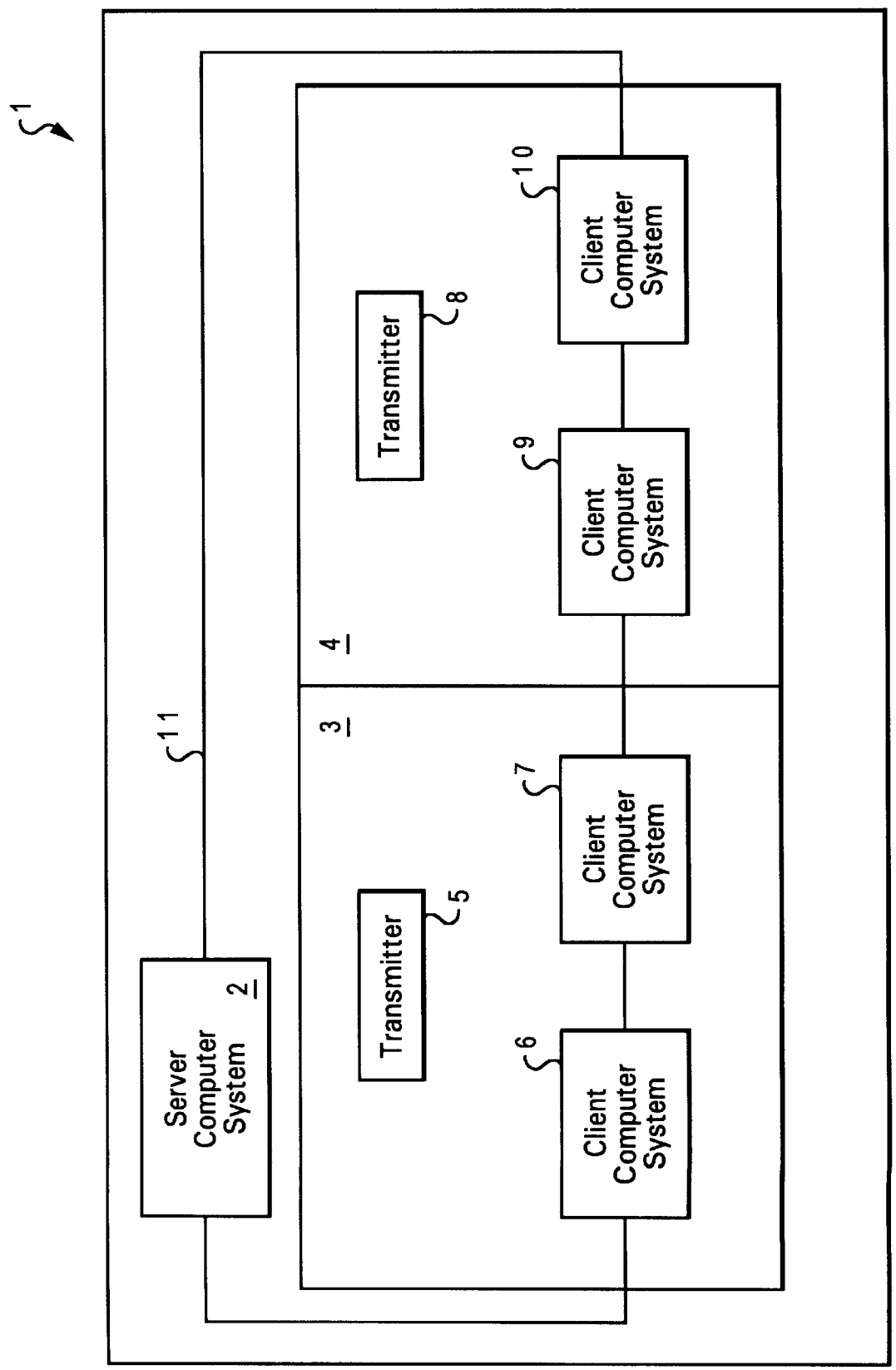
FIG. 1 depicts a high level block diagram of a data processing system 1 which includes a server computer system 2 and a plurality of client computer systems in accordance with the method and system of the present invention.

A preferred embodiment of the present invention and its advantages are better understood by referring to FIGS. 1–6 of the drawings, like numerals being used for like and corresponding parts of the accompanying drawings.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts and not as limiting upon the present invention.

The present invention is a method and system for remotely booting a client computer system, and for establishing a client/server association between a server computer system and the client computer system.

Physical regions are defined, within which are located a plurality of client computer systems. Multiple physical regions may be defined, each including at least one and typically a plurality of client computer systems. Each physical region also includes a transmitter associated with that physical region. The transmitter in a region transmits wireless radio frequency (RF) signals to its associated region.

Those skilled in the art will recognize that there is no rigid physical demarcation between adjoining physical regions. The wireless signals transmitted to a particular physical region will vary in strength. In order to transmit a signal strong enough to reach all points within the defined physical region, the signal will also overlap and be received within a small portion of any adjoining physical regions.

A physical region is specified within which at least one computer system is located which is to be powered up. A server computer system causes a wireless signal to be transmitted to the selected region utilizing the transmitter located within the specified region. The wireless signal includes a WAKE command.

A WAKE command is described which causes selected computer systems to power up and establish an association is over a local area network (LAN) with a server as a client computer system of that server. A WAKE command includes either a unique identifier for specifying a single computer system, or a universal identifier which specifies all computer systems which reside within the specified physical region within which the wireless signal including the WAKE command is transmitted. When the universal identifier is included within the WAKE command, each computer system located within the physical region in which the WAKE command is transmitted is specified. Each unique identifier specifies and is associated with a single, particular computer system.

Each computer system located within a specified physical region will receive the RF signals transmitted by the transmitter located within that physical region. Upon receipt of an RF signal, each computer system located within that physical region will determine whether the received signal includes a WAKE command which includes either the universal identifier or a unique identifier which specifies this computer system which received the RF signal. Therefore, each computer system located within this physical region will determine if it has been specified, either utilizing the universal identifier which specifies all computer systems in the region or utilizing a unique identifier which is associated with the particular computer system.

If a computer system determines that the received signal includes a WAKE command which includes either the universal identifier or a unique identifier which specifies this computer system, the computer system will power up and will establish an association with the server as a client computer system of that server. When the WAKE command includes the universal identifier, every computer system within the physical region will generally simultaneously power up and will establish an association with the server as a client computer system of that server.

In this manner, the present invention describes a method and system whereby a server computer system may cause only selected ones of remotely located computer systems to boot to the server computer system. The remote computer systems are located within physical regions. Only specified computer systems may be powered up, or all computer systems within a specified physical region may be generally simultaneously powered up.

FIG. 1 depicts a high level block diagram of a data processing system 1 which includes a server computer system 2 and a plurality of computer systems in accordance with the method and system of the present invention. Server computer system 2 and the plurality of computer systems are coupled together utilizing a local area network (LAN) 11. The computer systems have been placed within physical regions. Each physical region includes at least one transmitter. The transmitter in each physical region transmits a radio signal which is received by each computer system located within that physical region. The feature of transmitting a signal to a physical region is described fully in U.S. Pat. No. 5,712,973 issued on Jan. 27, 1998 which is incorporated herein by reference.

For example, computer systems 6 and 7, and transmitter 5 have been placed and are physically located within physical region 3. Computer systems 9 and 10, and transmitter 8 are physically located within physical region 4.

As an example, a decision could be made to wake all computer systems in physical region 3 and only computer system 9 in physical region 4. Server 2 would then transmit a WAKE command including a universal identifier to physical region 3 using transmitter 5, and a WAKE command including a unique identifier associated with computer system 9 to physical region 4 using transmitter 8. In response to a receipt of the WAKE command in physical region 3, computer systems 6 and 7 would generally simultaneously boot up as clients of server 2. In response to a receipt of the WAKE command in physical region 4, computer system 9 would boot up as a client of server 2. Computer system 10 would not boot up in response to its receipt of the WAKE command.

Figure 2:
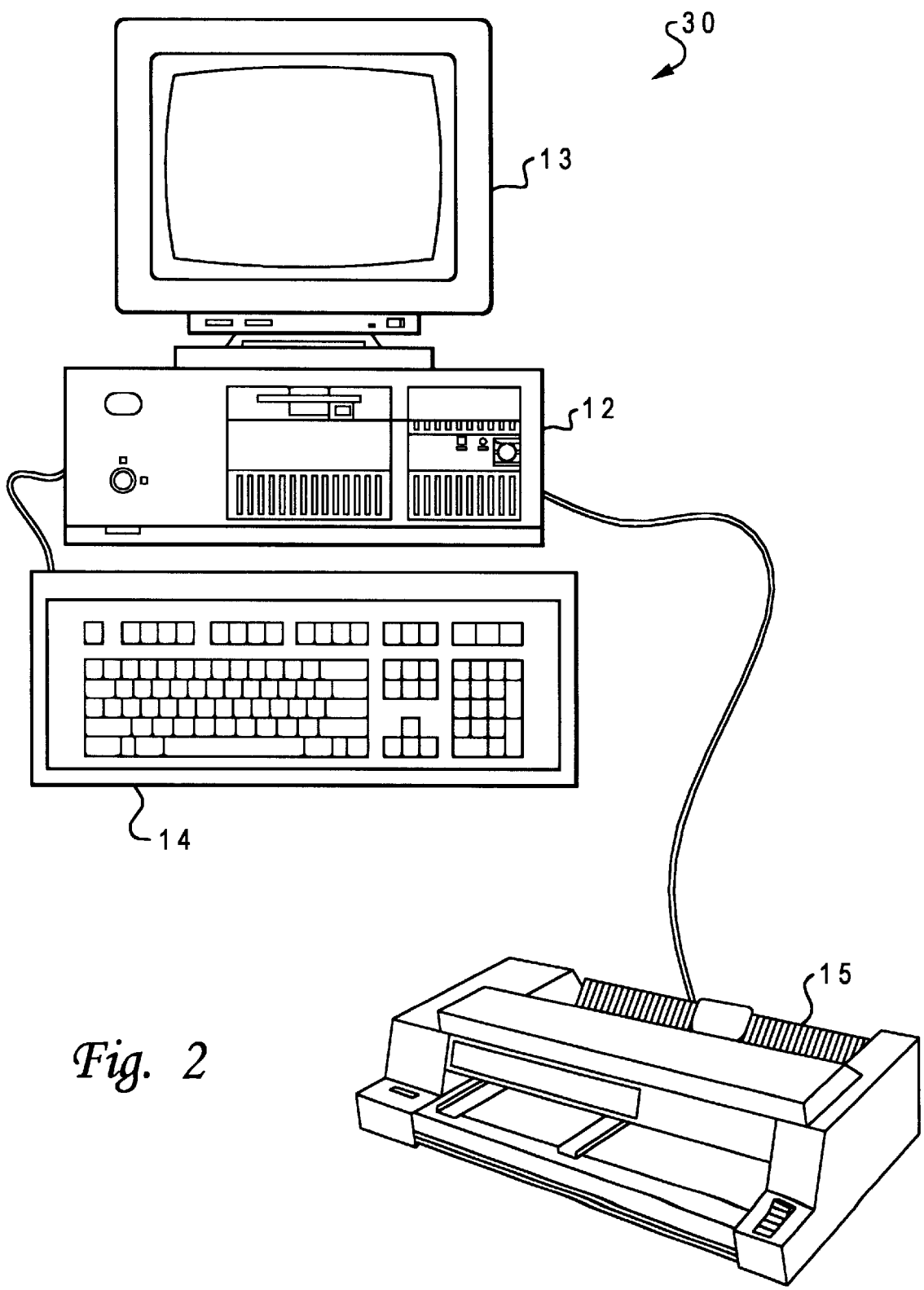
FIG. 2 illustrates a pictorial representation of a computer system which may be utilized to implement a server or client computer system described in FIG. 1 in accordance with the method and system of the present invention.

FIG. 2 illustrates a pictorial representation of a computer system which may be utilized to implement a server or client computer system described in FIG. 1 in accordance with the method and system of the present invention. Computer system 30 includes a computer 12, a monitor 13, a keyboard 14, and a printer or plotter 15. Computer system 30 may be utilized to implement any or all of server computer system 2 or client computer systems 6, 7, 9, or 10.

Figure 3:
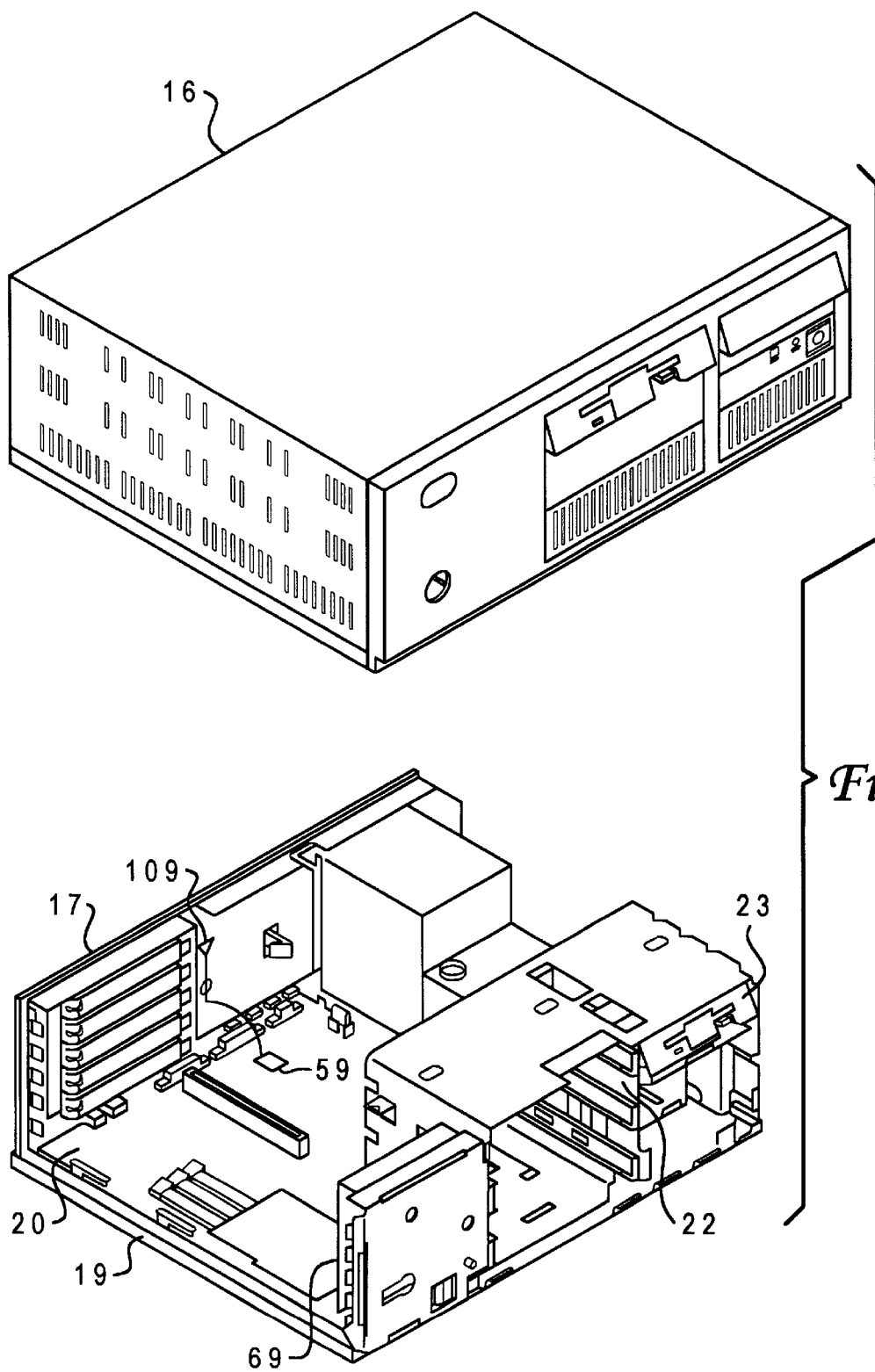
FIG. 3 depicts a pictorial representation of an exploded view of computer 12 in accordance with the method and system of the present invention.

FIG. 3 depicts a pictorial representation of an exploded view of computer 12 in accordance with the method and system of the present invention. Computer 12 has a cover 16 which cooperates with a chassis 19 in defining an enclosed shielded volume for receiving data processing and storage components for processing and storing digital data. At least certain of the system components are mounted on a multi-layer planar 20 (also commonly called a motherboard or system board) which is mounted on the chassis 19 and provides a means for mounting and electrically interconnecting various components of computer 12 including the CPU, system memory, and accessory cards or boards as is well known in the art.

Chassis 19 has a base and a rear panel 17 and defines at least one open bay 22 for receiving a data storage device such as a disk drive 23. At rear panel 17 or other suitable area, according to one aspect of the invention, an antenna 109 is mounted on computer 12 to collect radiation having a first predefined characteristic. Antenna 109 is intended to provide a signal to system 30 indicating radiation having the predefined characteristic is in the vicinity of computer system 30.

Figure 4:
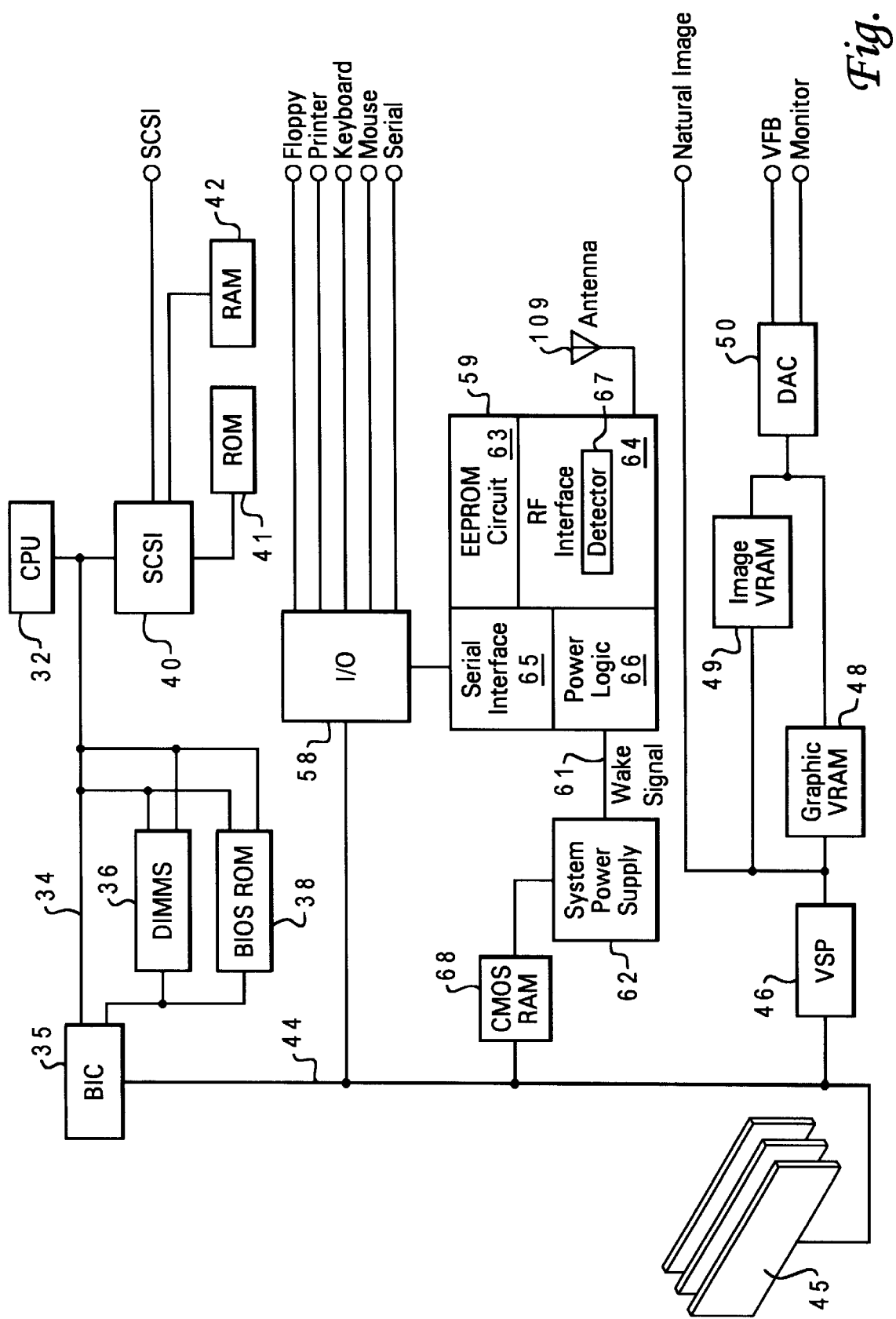
FIG. 4 illustrates a high level block diagram of computer system 30 illustrating the various components of computer system 30 in accordance with the method and system of the present invention.

FIG. 4 illustrates a high level block diagram of computer system 30 illustrating the various components of computer system 30 in accordance with the method and system of the present invention, including components mounted on the planar 20 and the connection of the planar to the I/O slots and other hardware of the personal computer system. Connected to the planar is the system processor 32. While any appropriate microprocessor can be used as the CPU 32, one suitable microprocessor is the Pentium which is sold by INTEL. The CPU 32 is connected by a high speed CPU local bus 34 to a bus interface control unit 35, volatile random access memory (RAM) 36 here shown as Dual Inline Memory Modules (DIMMS), and to BIOS ROM 38 in which is stored instructions for basic input/output operations to the CPU 32. The BIOS ROM 38 includes the BIOS that is used to interface between the I/O devices and the operating system of the microprocessor 32. Instructions stored in the BIOS ROM 38 can be copied into RAM 36 to decrease the execution time of BIOS. The system also has, as has become conventional, a circuit component which has battery backed non-volatile memory 68 (conventionally CMOS RAM) for receiving and retaining data regarding the system configuration and a real time clock (RTC).

While the present invention is described hereinafter with particular reference to the system block diagram of FIG. 4, it is to be understood at the outset of the description which follows that it is contemplated that the apparatus and methods in accordance with the present invention may be used with other hardware configurations of the planar board. For example, the system processor could be an lntel Pentium or Pentium II microprocessor.

Returning again to FIG. 4, the CPU local bus 34 (comprising data, address, and control components) also provides for the connection of the microprocessor 32 with a Small Computer Systems Interface (SCSI) controller 40. The SCSI controller 40 may, as is known to persons skilled in the arts of computer design and operation, be connected or connectable with Read Only Memory (ROM) 41, RAM 42, and suitable internal or external devices of a variety of types as facilitated by the I/O connection indicated to the right in the Figure. The SCSI controller 40 functions as a storage controller in controlling storage memory devices such as fixed or removable media electromagnetic storage devices (also known as hard and floppy disk drives), electro-optical, tape and other storage devices.

Bus interface controller (BIC) 35 couples CPU local bus 34 with an I/O bus 44. By means of bus 44, BIC 35 is coupled with an optional feature bus such as a PCI bus having a plurality of I/O slots for receiving PCI adapter cards 45 which may be further connected to an I/O device or memory (not shown). The I/O bus 44 includes address, data, and control components.

Coupled along I/O bus 44 are a variety of I/O components such as a video signal processor 46 which is associated with video RAM (VRAM) for storing graphic information 48 and for storing image information 49. Video signals exchanged with the processor 46 may be passed through a Digital to Analog Converter (DAC) 50 to a monitor or other display device. Provision is also made for connecting the VSP 46 directly with what is here referred to as a natural image input/output, which may take the form of a video recorder/player, camera, etc.

The I/O bus 44 is coupled utilizing an input/output controller 58 to an associated Electrical Erasable Programmable Read Only Memory (EEPROM) 59. Conventional peripherals, such as floppy disk drives, a printer or plotter 15, keyboard 14, and a mouse or pointing device (not shown), are coupled to I/O bus 44 utilizing I/O controller 58.

EEPROM 59 includes an EEPROM circuit 63, a serial interface 65 for inputting and outputting signals, a radio frequency (RF) interface 64 for receiving wireless signals, and a power management logic circuit 66. Power management logic circuit 66 is coupled to a system power supply 62 via a wake signal line 61. System power supply 62 is also coupled to CMOS RAM 68.

RF interface 64 receives wireless signals through antenna 109. RF interface 64 includes a wake detector 67 for detecting a receipt of an RF WAKE command. If a WAKE command is received which includes either the unique identifier for this particular client, or the universal identifier, wake detector 67 provides an active signal "WAKE-ON-RF" which is monitored by power management logic circuit 66. Upon an active WAKE-ON-RF signal, power management logic circuit 66 outputs a signal utilizing wake signal line 61 to system power supply 62 in order to power up computer system 30.

Figure 5:
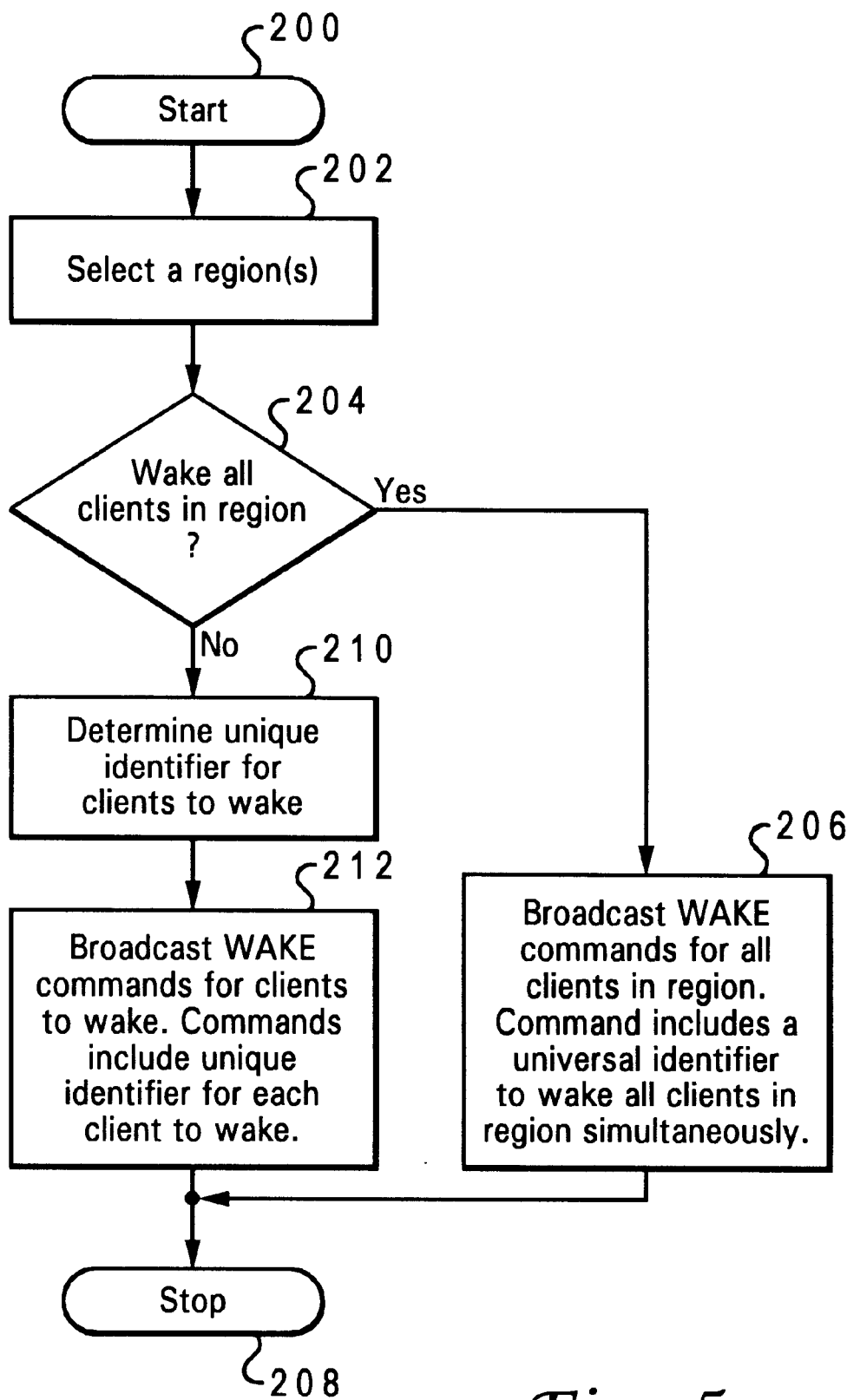
FIG. 5 depicts a high level flow chart illustrating a server computer system broadcasting a wireless signal to a selected physical region in accordance with the method and system of the present invention.

FIG. 5 depicts a high level flow chart illustrating a server computer system broadcasting a wireless signal to a selected physical region in accordance with the method and system of the present invention. The process starts as depicted by block 200 and thereafter passes to block 202 which illustrates a selection of a physical region or regions. Next, block 204 depicts a determination of whether or not all client computer systems in the selected region are to be awaken, i.e. powered up. If a determination is made that all client computer systems in the selected region are to be awaken, the process passes to block 206 which illustrates the server computer system transmitting a wireless signal including a WAKE command which includes a universal identifier. The universal identifier is utilized to wake all client computer systems in the physical region generally simultaneously.

Referring again to block 204, if a determination is made that only selected client computer systems are to be awaken, the process passes to block 210 which depicts a determination of a unique identifier for the selected client computer systems to wake. Each client computer system is associated with a unique identifier which identifies that particular client computer system. Next, block 212 illustrates a broadcasting of a wireless signal including a WAKE command for each client computer system to wake. The process then terminates as depicted by block 208.

Figure 6:
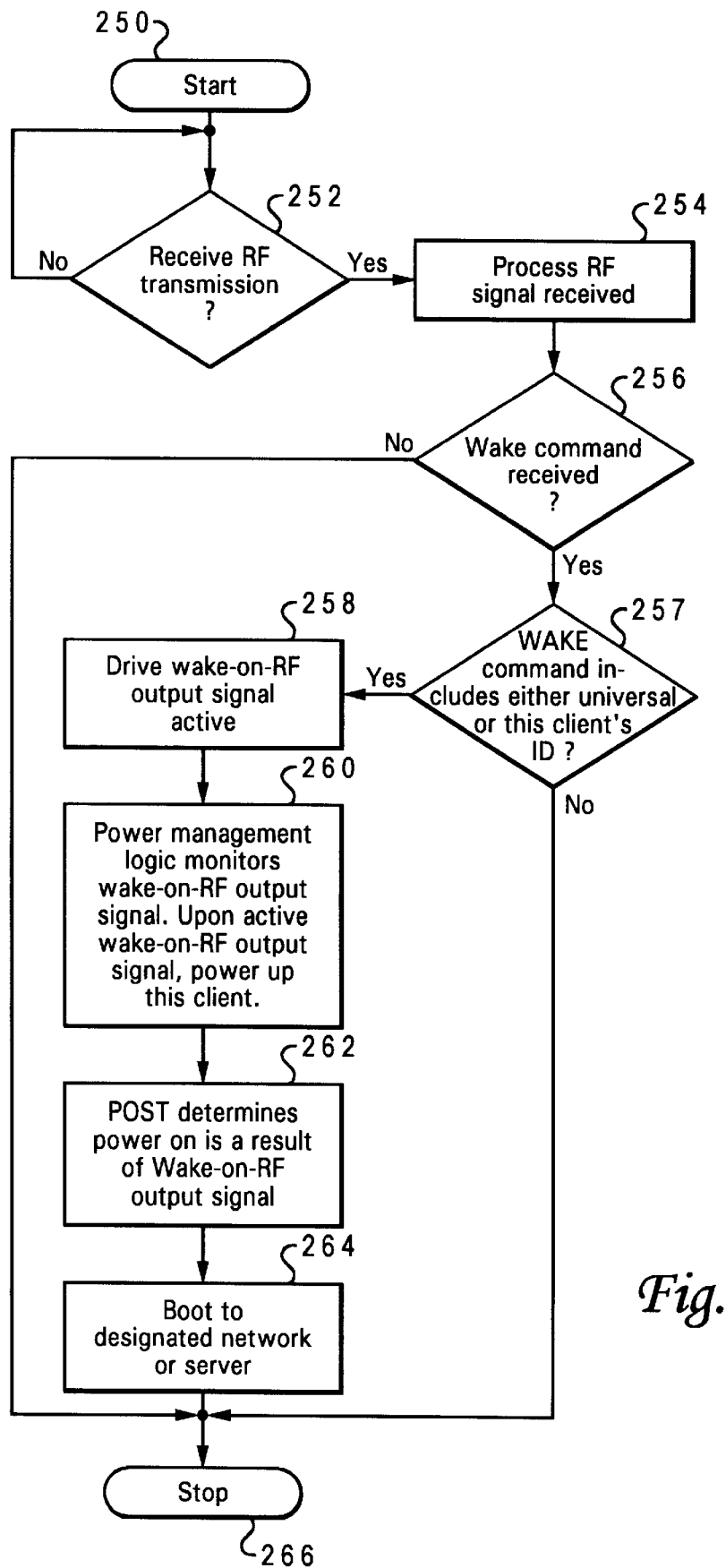
FIG. 6 illustrates a high level flow chart depicting a receipt of a wireless signal by a client computer system and the booting of the client computer system in response to the receipt of the signal in accordance with the method and system of the present invention.

FIG. 6 illustrates a high level flow chart depicting a receipt of a wireless signal by a client computer system and the booting of the client computer system in response to the receipt of the signal in accordance with the method and system of the present invention. The process starts as depicted at block 250 and thereafter passes to block 252 which illustrates a determination of whether or not the client computer system executing the process of FIG. 6 has received a radio frequency (RF) signal. Those skilled in the art will recognize that each client computer system will execute a process as described by FIG. 6.

If a determination is made that the client computer system executing the process of FIG. 6 has not received an RF transmission, the process loops back to block 252. If a determination is made that the client computer system executing the process of FIG. 6 has received an RF transmission, the process passes to block 254 which illustrates the client computer system processing the received RF signal.

Next, block 256 depicts a determination of whether or not the received RF signal included a WAKE command. If a determination is made that a wireless RF signal has been received which includes a WAKE command, the process passes to block 257 which depicts a determination of whether or not the WAKE command included either the universal identifier for selecting all client computer systems, or a unique identifier which is associated with the client computer system executing the process described by FIG. 6.

If a determination is made that the WAKE command does not include either the universal identifier or a unique identifier which identifies the client computer system executing the process described by FIG. 6, the process terminates as depicted by block 266. Referring again to block 257, if a determination is made by detector 67 that the WAKE command does include either the universal identifier or a unique identifier which identifies the client computer system executing the process described by FIG. 6, the process passes to block 258 which depicts detector 67 activating an output signal "WAKE-ON RF". Block 260, then, illustrates power management logic 66 monitoring the "WAKE-ON-RF" signal and powering up this client when the signal is active.

The process then passes to block 262 which depicts POST (power-on-self-test) determining that the power is now on as a result of the "WAKE-ON-RF" signal being active. Thereafter, block 264 illustrates this client computer system booting to the network or server designated by an alternate boot sequence which is utilized when the client computer system is powered on by as a result of the "WAKE-ON-RF" signal being active.

While a preferred embodiment has been particularly shown and described, it will be understood by those skilled in the art that various changes in form and detail may be made therein without departing from the spirit and scope of the present invention.

What is claimed is:

1. A method in a data processing system including a server computer system and at least one remote client computer system, said method comprising the steps of:
   said server computer system executing one of a plurality of operating systems;
   said at least one remote client computer system executing one of said plurality of operating systems;
   specifying a physical region within which at least one remote client computer system resides, said at least one remote client computer system being powered-off such that said client computer system is not receiving main power;
   transmitting a wireless signal to said physical region, said wireless signal specifying at least one client computer system to be powered-on, wherein said wireless signal is received by said at least one remote client computer system;
   determining whether said wireless signal includes a specification of said at least one remote client computer system; and
   in response to a determination that said signal includes a specification of said at least one remote client computer system, powering said at least one remote client computer system on, booting said at least one remote computer system, and establishing an association with said server computer system with said at least one remote computer system as a client of said server computer system.

2. The method according to claim 1, said at least one remote client computer system further including a plurality of client computer systems, wherein said plurality of client computer systems reside within said physical region.

3. The method according to claim 2, wherein said step of transmitting a wireless signal to said physical region further comprises the step of transmitting a wireless signal including a wake command to said physical region, said command including a first identifier, said first identifier being associated with a particular one of said plurality of client computer systems.

4. The method according to claim 3, further comprising the step of in response to a receipt of said wake command including said first identifier by said particular one of said plurality of client computer systems, powering-on only said particular one of said plurality of client computer systems, booting only said particular one, and establishing an association with only said particular one as a client with said server computer system wherein said particular one of said plurality of client computer systems boots from said server computer system, wherein no others of said plurality of client computer systems boot in response to a receipt of said wake command including said first identifier.

5. The method according to claim 4, further comprising the step of establishing a second identifier for simultaneously specifying all of said plurality of client computer systems.

6. The method according to claim 5, wherein said step of transmitting a wireless signal to said physical region further comprises the step of transmitting a wireless signal including a wake command to said physical region, said command including said second identifier.

7. The method according to claim 6, further comprising the step of in response to a receipt of said wake command including said second identifier by said plurality of client computer systems, all of said plurality of client computer systems booting generally simultaneously, and each of said plurality of client computer systems establishing an association as a client with said server computer system.

8. The method according to claim 7, further comprising the step of associating each of said plurality of client computer systems with a different unique identifier, wherein said different unique identifier is utilized to specify only one of said plurality of client computer systems.

9. The method according to claim 8, wherein said step of transmitting a wireless signal including a wake command including a first identifier to said physical region, further comprises the step of transmitting a wireless signal including a wake command including a unique identifier associated with said particular one of said plurality of client computer systems.

10. The method according to claim 9, further comprising the step of establishing a second plurality of client computer systems within a second physical region, wherein said second plurality of client computer systems physically reside within said second physical region.

11. The method according to claim 10, further comprising the step of determining a physical region to query.

12. The method according to claim 11, further comprising the step of in response to a determination that said physical region to query is said physical region, transmitting said signal including said wake command only to said plurality of client computer systems.

13. The method according to claim 12, further comprising the step of in response to a determination that said physical region to query is said second physical region, transmitting said signal including said wake command only to said second plurality of client computer systems.

14. A data processing system including a server computer system and at least one remote client computer system, comprising:

said server computer system for executing one of a plurality of operating systems;

said at least one remote client computer system for executing one of said plurality of operating systems;

means for specifying a physical region within which at least one remote client computer system resides, said at least one remote client computer system being powered-off such that said client computer system is not receiving main power;

means for transmitting a wireless signal to said physical region, said wireless signal specifying at least one client computer system to be powered-on, wherein said wireless signal is received by said at least one remote client computer system;

means for determining whether said wireless signal includes a specification of said at least one remote client computer system; and means responsive to a determination that said signal includes a specification of said at least one remote client computer system, for powering said at least one remote client computer system on, booting said at least one remote computer system, and establishing an association with said server computer system with said at least one remote computer system as a client of said server computer system.

15. The system according to claim 14, said at least one remote client computer system further including a plurality of client computer systems, wherein said plurality of client computer systems reside within said physical region.

16. The system according to claim 15, wherein said means for transmitting a wireless signal to said physical region further comprises means for transmitting a wireless signal including a wake command to said physical region, said command including a first identifier, said first identifier being associated with a particular one of said plurality of client computer systems.

17. The system according to claim 16, further comprising means responsive to a receipt of said wake command including said first identifier by said particular one of said plurality of client computer systems, for powering-on only said particular one of said plurality of client computer systems, booting only said particular one, and establishing an association with only said particular one as a client with said server computer system wherein said particular one of said plurality of client computer systems boots from said server computer system, wherein no others of said plurality of client computer systems boot in response to a receipt of said wake command including said first identifier.

18. The system according to claim 17, further comprising means for establishing a second identifier for simultaneously specifying all of said plurality of client computer systems.

19. The system according to claim 18, wherein said means for transmitting a wireless signal to said physical region further comprises means for transmitting a wireless signal including a wake command to said physical region, said command including said second identifier.

20. The system according to claim 19, further comprising means responsive to a receipt of said wake command including said second identifier by said plurality of client computer systems, for all of said plurality of client computer systems booting generally simultaneously, and each of said plurality of client computer systems establishing an association as a client with said server computer system.

21. The system according to claim 20, further comprising means for associating each of said plurality of client computer systems with a different unique identifier, wherein said different unique identifier is utilized to specify only one of said plurality of client computer systems.

22. The system according to claim 21, wherein said means for transmitting a wireless signal including a wake command including a first identifier to said physical region, further comprises means for transmitting a wireless signal including a wake command including a unique identifier associated with said particular one of said plurality of client computer systems.

23. The system according to claim 22, further comprising means for establishing a second plurality of client computer systems within a second physical region, wherein said second plurality of client computer systems physically reside within said second physical region.

24. The system according to claim 23, further comprising means for determining a physical region to query.

25. The system according to claim 24, further comprising means responsive to a determination that said physical region to query is said physical region, for transmitting said signal including said wake command only to said plurality of client computer systems.

26. The system according to claim 25, further comprising means responsive to a determination that said physical region to query is said second physical region, for transmitting said signal including said wake command only to said second plurality of client computer systems.

27. A method in a data processing system including a server computer system and at least one remote client computer system, said method comprising the steps of:

said server computer system executing one of a plurality of operating systems;

said at least one remote client computer system executing one of said plurality of operating systems;

specifying a physical region within which a plurality of client computer systems reside;

transmitting a wireless signal including a wake command to said physical region, said command including a first identifier, said first identifier being associated with a particular one of said plurality of client computer systems;

determining whether said wireless signal includes a specification of said at least one remote client computer system;

in response to a determination that said signal includes a specification of said at least one remote client computer system, said at least one remote client computer system booting and establishing an association with said server computer system as a client of said server computer system;

in response to a receipt of said wake command including said first identifier by said particular one of said plurality of client computer systems, only said particular one of said plurality of client computer systems booting and establishing an association as a client with said server computer system, wherein no others of said plurality of client computer systems boot in response to a receipt of said wake command including said first identifier;

establishing a second identifier for simultaneously specifying all of said plurality of client computer systems;

transmitting a wireless signal including a wake command to said physical region, said command including said second identifier; and in response to a receipt of said wake command including said second identifier by said plurality of client computer systems, all of said plurality of client computer systems booting generally simultaneously, and each of said plurality of client computer systems establishing an association as a client with said server computer system.

28. A data processing system including a server computer system and at least one remote client computer system, comprising:

said server computer system for executing one of a plurality of operating systems;

said at least one remote client computer system for executing one of said plurality of operating systems;

means for specifying a physical region within which a plurality of client computer systems reside;

means for transmitting a wireless signal to said physical region, wherein said wireless signal is received by said at least one remote client computer system;

means for determining whether said wireless signal includes a specification of said at least one remote client computer system;

means responsive to a determination that said signal includes a specification of said at least one remote client computer system, for said at least one remote client computer system booting and establishing an association with said server computer system as a client of said server computer system;

means for transmitting a wireless signal including a wake command to said physical region, said command including a first identifier, said first identifier being associated with a particular one of said plurality of client computer systems; and means responsive to a receipt of said wake command including said first identifier by said particular one of said plurality of client computer systems, for only said particular one of said plurality of client computer systems booting and establishing an association as a client with said server computer system, wherein no others of said plurality of client computer systems boot in response to a receipt of said wake command including said first identifier.

* * * * *